Figure 1:
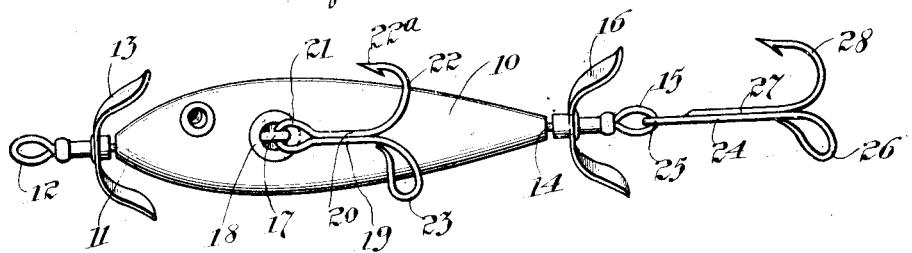

C. HEDDON.
FISH HOOK.
APPLICATION FILED DEC. 26, 1912.

1,133,724.

Patented Mar. 30, 1915.

Witnesses
Charles G. Cope
Mae Hanover

Inventor
Charles Heddon
By Jones, Addington, Ames & Seibold
Attys.

UNITED STATES PATENT OFFICE.

CHARLES HEDDON, OF DOWAGIAC, MICHIGAN.

FISH-HOOK.

1,133,724.　　　　　Specification of Letters Patent.　　Patented Mar. 30, 1915.

Application filed December 26, 1912.　Serial No. 738,588.

*To all whom it may concern:*

Be it known that I, CHARLES HEDDON, a citizen of the United States, residing at Dowagiac, in the county of Cass and State of Michigan, have invented new and useful Improvements in Fish-Hooks, of which the following is a full, clear, concise, and exact description, reference being had to the accompanying drawing, forming a part of this specification.

My invention pertains to fish-hooks; and relates especially to fish-hooks intended for use in connection with artificial lures.

One of the most usual forms of artificial lure is the artificial minnow, comprising an elongated fish-shaped body, generally formed of wood, and usually having a spinner at each end and one or more multiple hooks (usually triple hooks) at each side, these hooks being mounted so that they normally extend backward along the body in a position to strike readily into the jaws of a fish taking the lure. In addition to the multiple hooks mentioned above, the minnow is usually also supplied with a multiple hook at the tail. The multiple hooks referred to above have numerous disadvantages. In the first place, the use of them is considered unsportsmanlike. In the second place, a multiple hook does not strike as firmly into the jaw of the fish as does a single hook, for the reason that the pull applied by the fisherman to the line is distributed over a number of points instead of one; consequently, the fish, when struck, is not as securely hooked. Also, it is not difficult for a fish to shake itself clear of a multiple hook when one of the barbs has entered the upper jaw and another has entered the lower jaw, for the reason that the fish is then enabled to obtain a purchase on the hook which otherwise would be impossible. In the third place, the use of the triple or double hook has been rendered illegal in many localities. The multiple hook has the advantage, however, that, when a fish bites upon it, one or more of the hook-points form an abutment which operates to force another hook-point into the jaw of the fish, thus insuring that the fish be hooked. The single hook is preferable to the multiple hook in that it holds a fish, when hooked, more securely, and that its use is permitted in all localities; it has the disadvantage, however, that it is not certain that a fish biting on it will be hooked. This disadvantage is especially important when the single hook is used in connection with an artificial lure; since, in such case, the fish must be hooked immediately it bites upon the lure.

It is an object of my invention to provide a fish-hook which will combine the more important advantages of the single and multiple forms of hook, and which will be subject to the disadvantages of neither of them.

It is a further object of my invention to provide an improved single hook particularly adapted for use in connection with artificial lures.

Other objects will appear from the detailed description and claims.

One embodiment of my invention is described, by way of example, in the following specification, and shown in the accompanying drawing. It is to be understood, however, that the embodiment shown and described is not the only form which my invention may take, but that changes may be made therein, within the scope of the appended claims.

Figure 2:
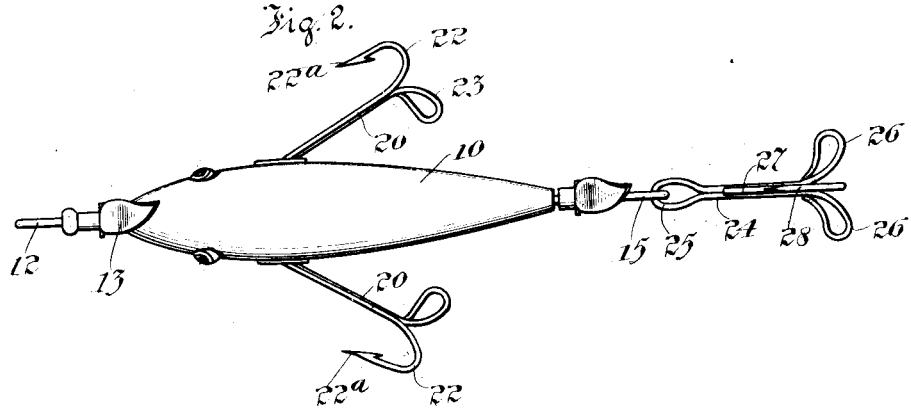
Figure 3:
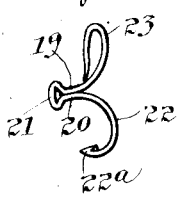

In the drawing—Figure 1 is a side elevation of an artificial minnow equipped with hooks constructed in accordance with my invention; Fig. 2 is a plan of the same; and Fig. 3 is an end view of one of the hooks, looking from the shank end thereof.

Referring now to the drawing, the artificial minnow includes a fish-shaped body 10, which is preferably formed of wood ornamented in any desired manner. The body 10 has screwed thereinto, at the front end, a stem 11 formed with an eye 12, to which the fish line is adapted to be connected.

Mounted upon the stem 11, between the eye 12 and the body 10, is a front spinner 13.

Screwed into the rear end of the body 10 is a stem 14 formed with an eye 15, and having mounted thereon a rear spinner 16.

Secured in the body 10, one on each side thereof somewhat to the front of the center, are two eyes 17 for receiving the side hooks, the material of the body 10 being protected by means of eyelets 18, formed of brass or the like, surrounding the eyes 17.

The parts of the artificial minnow so far described are of a construction well known in the art.

Each of the eyes 17 carries a side-hook. Each of these side-hooks is composed of a single piece of wire bent so as to form two shank members 19 and 20 lying side by side and forming an eye 21 at one end, adapted to be looped into one of the eyes 17. The shank member 20 is formed, at the end remote from the eye 21, into an ordinary hook-bend 22, terminating in a barbed point 22ᵃ. The shank member 19 is formed at the end thereof remote from the eye 21, into a loop 23 which extends oppositely from the base of the hook-bend 22. The base of the loop 23 follows the general curve of the hook-bend 22; but the end of the loop is bent back to touch, or approximately touch, the shank member 19, whereby a firm projection or abutment, extending oppositely from the hook-bend is produced, which projection is incapable of penetrating, that is, "hooking" a fish. While I have shown the hook bend and the projection or abutment lying in the same plane, and this arrangement is preferred, it will understood that if desired, the projection or abutment may be placed in other angular relations with respect to the hook bend.

The side-hooks, when inserted into the eyelets 17, are supported by the reinforcing eyelets 18 in such a manner that they will extend backwardly and outwardly in a position ready to strike into the jaw of a fish attempting to take the lure. When a fish bites upon the minnow, the loop or projection 23, which may be appropriately termed the "dummy," of whichever hook has been taken will engage the lower jaw of the fish, thus causing the point 22ᵃ to enter the upper jaw of the fish.

A tail-hook is attached to the eye 15 of the rear stem 14. This hook, in the embodiment of my invention now being described, is provided with two dummies, and consists of a piece of wire bent to form two shank members 24 forming an eye 25 at one end, adapted to be looped into the eye 15. At the ends of the shank members 24 are formed two dummies 26 similar to the dummy 23 described above, and disposed with relation to each other in the same way as two of the hook-points of an ordinary triple hook would be disposed. Soldered to the shank members 24 is the shank 27 of a hook-bend 28, this hook bend occupying the same position, relatively to the dummies 26, as would the third hook-bend of an ordinary triple hook. The tail-hook is looped to the eye 15 in such a manner that the hook-bend 28 projects upwardly. When a fish bites upon the tail-hook, the dummies 26 cause the hook-point 28 to enter the upper jaw of the fish, in the manner which has been described above when dealing with the side hooks.

It will be seen that the hooks described above have the advantage, previously only present in hooks of the multiple type, that the dummy causes the point of the hook to enter the jaw of the fish when the hook is bitten upon. This is a feature of great importance, especially as characterizing the hooks of an artificial lure. When the hooks are employed in connection with a lure with their points extending upward, as described above, the dummies 23 and 26, besides exercising the functions set forth above, form weedless projections, protecting the hooks from weeds or the like, and enabling the lure to be drawn over a bank of weeds, for instance, with little danger of the hooks becoming entangled in the same.

While in the foregoing specification I have described a preferred embodiment of my invention in which a single hook point and a single abutment, each having a particular configuration are employed, it is to be understood that variations may be made in these respects without exceeding the scope of my invention, as defined in the appended claims.

Having thus described my invention, what I claim as new and desire to secure by Letters Patent, is:

1. A fish hook including a pointed hook bend and a non-penetrating projection located substantially at said hook bend and disposed so as to extend in a direction away from said hook bend.

2. A fish hook including a pointed hook bend and a blunt loop located substantially at said hook bend and disposed so as to extend in a direction away from said hook bend.

3. A fish hook including a double shank, one part of which terminates in a pointed hook bend, the other part forming a blunt loop located substantially at said hook bend and disposed so as to extend in a direction away from said hook bend.

4. In an artificial fish lure, the combination with a body, of a hook carried thereby, said hook including a pointed hook bend and a non-penetrating projection located substantially at said hook bend and disposed so as to extend in a direction away from said hook bend.

5. In an artificial fish lure, the combination with a body, of a fish hook attached thereto and comprising a pointed hook bend, and a blunt loop located substantially at said hook bend and disposed so as to extend in a direction away from said hook bend.

In witness whereof, I have hereunto subscribed my name in the presence of two witnesses.

CHARLES HEDDON.

Witnesses:
ELIZABETH A. CROMB,
WM. A. SHELIM.